United States Patent [19]

Lancaster et al.

[11] Patent Number: 4,585,804

[45] Date of Patent: Apr. 29, 1986

[54] RIGID FOAM WITH IMPROVED "K" FACTOR BY REACTING A POLYOL, A POLYISOCYANATE AND AT LEAST ONE COMPOUND HAVING AT LEAST ONE PRIMARY ALIPHATIC AMINE GROUP

[75] Inventors: Gerald M. Lancaster, Surfside; Robert B. Turner; Llewellyn D. Booth, both of Lake Jackson, all of Tex.

[73] Assignee: The Dow Chemical Company, Midland, Mich.

[21] Appl. No.: 697,418

[22] Filed: Jan. 31, 1985

Related U.S. Application Data

[63] Continuation of Ser. No. 549,960, Nov. 8, 1983, abandoned, which is a continuation-in-part of Ser. No. 316,245, Oct. 29, 1981, abandoned, which is a continuation-in-part of Ser. No. 247,468, Mar. 25, 1981, abandoned.

[51] Int. Cl.$^4$ .............................................. C08G 18/14
[52] U.S. Cl. .................................. 521/128; 252/182; 521/159; 521/163; 521/164; 521/167
[58] Field of Search ............... 521/128, 159, 163, 164, 521/167; 252/182

[56] References Cited

U.S. PATENT DOCUMENTS 3,179,606  4/1965  Prescott et al. ..................... 521/167

FOREIGN PATENT DOCUMENTS 863223  2/1971  Canada .

OTHER PUBLICATIONS

Saunders et al., *Polyurethanes*, Part II, Interscience, NY, 1984, p. 212.

*Primary Examiner*—Maurice J. Welsh
*Attorney, Agent, or Firm*—Gary C. Cohn

[57] ABSTRACT

The K-factor and/or dimensional stability and/or expansion at demold properties of rigid foams are improved by including in the reaction mixture containing a polyol, polyisocyanate, foaming agent and catalyst, an appropriate amount of a compound containing at least one aliphatic primary amine group such as ethylene diamine.

15 Claims, No Drawings

RIGID FOAM WITH IMPROVED "K" FACTOR BY REACTING A POLYOL, A POLYISOCYANATE AND AT LEAST ONE COMPOUND HAVING AT LEAST ONE PRIMARY ALIPHATIC AMINE GROUP

CROSS-REFERENCE TO RELATED APPLICATION

This is a continuation of Ser. No. 549,960, filed Nov. 8, 1983, now abandoned, which is a continuation-in-part of application Ser. No. 316,245, filed Oct. 29, 1981, now abandoned, which is a continuation-in-part of application Ser. No. 247,468, filed Mar. 25, 1981, now abandoned.

BACKGROUND OF THE INVENTION

The present invention is directed to an improvement in rigid foams.

Rigid polyurethane foams are well known in the art as described in POLYURETHANES: CHEMISTRY AND TECHNOLOGY PART II TECHNOLOGY, by Saunders and Frisch, Interscience Publishers, 1964, Chapter VII, Rigid Foams, pp 193-298 all of which is incorporated herein by reference. Such foams have utility as insulation for tanks, pipes and the like as well as refrigerator and freezer cabinets and the like.

In such applications, the K-factor, dimensional stability and/or expansion at demold are significant properties. The present invention provides a method for improving one or more of these properties.

SUMMARY OF THE INVENTION

The present invention pertains to an improvement in a process for preparing a rigid foam by reacting a mixture containing (A) at least one polyol compound containing a plurality of hydroxyl groups with (B) a compound or mixture of compounds containing a plurality of NCO and/or NCS groups said polyol(s) and compound(s) containing NCO and/or NCS groups being of sufficient functionality, equivalent weight and quantity so as to result in a rigid foam in the presence of (C) at least one foaming agent and (D) at least one catalyst; wherein the improvement comprises incorporating into said reaction mixture, (E) at least one comound having at least one primary aliphatic amine group and having an average molecular weight of from about 60 to about 200, preferably from about 100 to about 150 in an amount which provides a ratio of aliphatic amine hydrogen equivalents to hydroxyl equivalents of from about 0.025:1 to about 0.25:1, preferably from about 0.06:1 to about 0.15:1 so as to improve at least one of the properties of the resultant foam selected from (a) K-factor, (b) dimensional stability and (c) expansion at demold.

The present invention also pertains to rigid foams having such improved properties.

The present invention further pertains to a mixture of active hydrogen-containing materials which comprises:
  (A) a polyol or a mixture of polyols which polyol or polyol mixture has an average hydroxyl functionality of from about 2 to about 8, preferably from about 2.5 to about 6 and most preferably from about 3 to about 5, and an average hydroxyl equivalent weight of from about 50 to about 250, preferably from about 69 to about 180 and most preferably from about 80 to about 130; and
  (B) at least one compound having at least one primary aliphatic amine group having an average molecular weight of from about 60 to about 200, preferably from about 100 to about 150;
wherein component (B) is present in a quantity which provides a ratio of aliphatic amine hydrogen equivalents to hydroxyl equivalents of from about 0.025:1 to about 0.25:1, preferably from about 0.06:1 to about 0.15:1 such that the foam which results from subjecting to foaming conditions a mixture containing
  (1) said mixture of (A) and (B);
  (2) at least one compound containing a plurality of NCO and/or NCS groups;
  (3) at least one foaming agent and
  (4) at least one catalyst for reacting component (1) with component (2), said components being of sufficient functionality, equivalent weight and quantity such that the resulting foam is rigid in character
has an improvement in one or more of the properties selected from (a) K-factor (b) dimensional stability and (c) expansion at demold when compared to such property of a foam prepared from components (1), (2), (3) and (4) except that component (1) does not contain component (B).

DESCRIPTION OF THE INVENTION

Suitable compounds having a plurality of hydroxyl groups which can be employed herein include polyether polyols and polyester polyols which are well known in the art such as, for example, as disclosed in U.S. Pat. Nos. 2,697,118; 2,884,459; 2,962,455; 2,990,376; 2,927,918 and 3,865,806 all of which are incorporated herein by reference.

Particularly suitable are the polyether polyols resulting from the reaction of an initiator compound with an alkylene oxide or substituted alkylene oxide or mixtures thereof.

Particularly suitable initiator compounds include, for example, sucrose, glycerine, pentaerythritol, sorbitol, α-methyl glucoside, trimethylolpropane, ethylenediamine, diethylenetriamine, aminoethylethanolamine, phenol-aldehyde novolac resins, aniline, toluenediamine, methylenedianiline, bis(aminobenzyl)aniline, mixtures thereof and the like.

Suitable alkylene oxides or substituted alkylene oxides include, for example, ethylene oxide, propylene oxide, 1,2-butylene oxide, 2,3-butylene oxide, epichlorohydrin, epibromohydrin, methylepichlorohydrin, methylepibromohydrin, styrene oxide, mixtures thereof and the like.

It is preferred that the polyol or mixture of polyols have an average hydroxyl functionality of from about 2 to about 8, preferably from about 2.5 to about 6 and most preferably from about 3 to about 5, and an active hydroxyl equivalent weight of from about 50 to about 250, preferably from about 69 to about 180 and most preferably from about 80 to about 130.

Polyols having equivalent weights of up to about 2000 can be employed in mixture with low equivalent weight polyols provided that the resultant mixture has the aforementioned equivalent weight.

Suitable compounds having a plurality of NCO groups include, for example, 2,4-toluenediisocyanate, 2,6-toluenediisocyanate, methylenediphenyldiisocyanate, polymethylenepolyphenylisocyanate, mixtures thereof and the like. Such polyisocyanates include both the crude and distilled products, all of which are commercially available.

Suitable compounds having a plurality of NCS groups include those NCS-containing compounds corresponding to the aforementioned NCO-containing compounds.

Also suitable are the NCO- and NCS-containing prepolymers (urethane modified) prepared from hydroxyl-containing compounds and the aforementioned NCO- and/or NCS-containing compounds.

Also suitable are the carbodimide modified polyisocyanates which can be prepared by reacting a suitable polyisocyanate with itself or another polyisocyanate in the presence of a suitable catalyst such as triethylphosphate.

The NCO- or NCS-containing compounds suitably have an equivalent weight of from about 80 to about 250, preferably from about 100 to about 160, and an average functionality of from about 2 to about 4, preferably from about 2.3 to about 3.5.

Suitable compounds having at least one aliphatic primary amine group include, for example, ethylenediamine, diethylenetriamine, triethlenetetramine, tetraethylenepentamine, aminated polyglycols, aminoethylethanolamine mixtures thereof and the like.

The aliphatic primary amine-containing compound is of the type and in an amount such that the resultant foam has an improvement in one or more of the properties selected from K-factor, dimensional stability and expansion at demold. It is preferred that the aliphatic primary amine-containing compound be either a liquid or be soluble in one of the other components employed in preparing the foam such as the polyol, cell control agent, foaming agent, fire retardant agent or other such component.

The primary aliphatic amine-containing compound is suitably employed in quantities such that the weight percent of the theoretical reaction product of the amine hydrogen atoms of the aliphatic primary amine-containing compound with a stoichiometric quantity of NCO and/or NCS containing-compound based upon the combined weight of the polyol component, NCO and/or NCS containing component, the aliphatic primary-amine containing component and any other component having one or more active hydrogens reactive with said NCO and/or NCS containing compounds is from about 1 to about 30, preferably from about 3 to about 15. The aforementioned weight percent is hereinafter referred to as % urea for the sake of brevity.

The quantities of the NCO and/or NCS containing compound is such that the NCX (wherein X is O and/or S) to active hydrogen ratio is from about 0.7:1 to about 5:1, preferably from about 0.8:1 to about 3:1. For purposes of the calculation herein, any hydroxyl, primary amine hydrogen and secondary amine hydrogen are considered active hydrogens whether or not in actuality a reaction occurs between said group and an NCO and/or NCS group.

Suitable catalysts which can be employed to catalyze the reaction between the active hydrogen atoms of the polyol and primary aliphatic amine-containing compound include, for example, tertiary amines, organometallic compounds and the like.

Particularly suitable catalysts include, for example, N-methylmorpholine, N-ethylmorpholine, triethylenediamine, stannous octoate, dibutyl tin dilaurate, tin mercaptide, potassium octoate, lead octoate, triethylamine, dimethylaniline, methyldiethylamine, dimethylethylamine, potassium acetate, tris(dimethylaminomethyl)phenol, dimethylethanolamine, mixtures thereof and the like.

Suitable blowing agents include low boiling hydrocarbons and halogen substituted hydrocarbons. Particularly suitable blowing agents include, for example, methylene chloride, trichloromonofluoromethane, 1,2-dibromotetrafluoroethane, 1,1,2-trichlorotrifluoroethane, 1,1,1-trichloroethane, mixtures thereof and the like.

If desired flame retarding agents can be employed. Suitable such agents include, for example, tris(chloroethyl)phosphate, tris(2,3-dibromopropyl)phosphate, dibromoneopentylglycol, mixtures thereof and the like.

The polyurethane foams can also be formed so as to contain isocyanaurate groups by employing desired excess quantities of NCO groups over that necessary to react with the active hydrogen atoms by employing an isocyanurate-forming catalyst. Suitable such catalysts include, for example, quaternary ammonium hydroxide, alkali metal hydroxide, alkali metal salts of carboxylic acids, tertiary amines, zwitterions, mixtures thereof and the like. Suitable alkali metal carboxylic acid salts include, for example, sodium acetate, potassium acetate, potassium octoate, sodium benzoate and the like. Such alkali metal salts of carboyxlic acids are more fully described in U.S. Pat. No. 4,126,741 which is incorporated herein by reference. Suitable tertiary amines include, for example, N,N'-diethylpiperazine, trimethylamine, triethylenediamine, tributylamine, 2,4,6-tris(dimethyl-3-aminopropyl-5-hexahydro)triazine, mixtures thereof and the like. Suitable zwitterions are disclosed in U.S. Pat. No. 4,111,914 by Kresta and Shen which is incorporated herein by reference.

The following examples are illustrative of the present invention but are not to be construed as to limiting the scope thereof in any manner.

The physical properties of the foams were obtained as follows:

K-FACTOR—Measured on an $8'' \times 8'' \times 1''$ sample cut from a nominal 2 lb/ft$^3$ part density $2' \times 2' \times 2''$ panel using a Anacon thermal conductivity measuring device.

DIMENSIONAL STABILITY—% packing to non-shrink density defined below.

MINIMUM FULL—Measured on a Brett mold by inserting less foam reaction components than is necessary to fill the mold thus resulting in an incomplete part. The part density of the incomplete part is determined and is ratioed to the known volume of the mold so as to ascertain the minimum amount of reaction products required to fill the mold.

% PACKING TO NON-SHRINK DENSITY—The weight percent of the difference between the part density and the minimum fill density is the % packing. The packing level is varied in order to determine the minimum % packing which results in no shrinkage of a Brett molded part when placed in a $-20°$ F. environment for 24 hours. The % packing in which no shrinkage is observed is the % packing to non-shrink density.

EXPANSION AT DEMOLD—Upon unclamping the Brett mold, the gap or expansion between the two mold halves is measured at 6 minutes from the time of filling the mold. The Brett mold is filled to 14% excess of the minimum fill density.

COMPRESSIVE STRENGTH—determined by ASTM D1691.

DENSITY (PANEL)—determined by dividing the total panel weight by the total panel volume.

DENSITY (CORE)—determined by ASTM D1622.

BRETT MOLD—A mold developed by the refrigeration industry in Europe which has a cavity measuring 200 cm×20 cm×5 cm.

The following components were employed in the examples and experiments.

POLYOL A is an adduct of a mixture of sucrose and glycerine (64% and 36% weight, respectively) and about 1.5 moles propylene oxide per hydroxyl group contained in the mixture. The resulting polyol has a hydroxyl functionality of ∼4.6 and a % OH of ∼13.4 (∼126.8 OH equiv. wt.).

POLYOL B is a polyoxypropylene glycol having a % OH of ∼3.3 (∼515.2 OH equiv. wt.).

POLYOL C is the adduct of propylene oxide and ethylene diamine in quantities so as to provide about 1.5 moles of propylene oxide per amine hydrogen atom. The resultant polyol has a functionality of 4 and a % OH of ∼15.6 (∼109 OH eq. wt.).

POLYOL D is the reaction product of a mixture of sucrose and triethanol amine in a molar ratio of 0.44/1 respectively and propylene oxide in an amount of about 1.15 moles of propylene oxide per hydroxyl group contained in the mixture. The resultant polyol has an average OH functionality of ∼4.5 and a % OH of ∼15.3 (111.1 OH eq. wt.).

POLYOL E is the reaction product of an 80/20 mixture of 2,4,-/2,6-toluene diamine with about 1.0 moles of propylene oxide per amine hydrogen atom end capped with about 1.0 moles of ethylene oxide per mole of propylene oxide employed. The resultant polyol has an OH functionality of 4 and a % OH of ∼11.99 (∼141.8 OH eq. wt.).

POLYOL F is the reaction product of a mixture of sucrose and glycerine in a molar ratio of 0.3 to 1.0 respectively and 1.2 moles of propylene oxide per OH group contained in the mixture. The resultant polyol has an OH functionality of ∼4.3 and a % OH of ∼14.8 (∼114.9 OH eq. wt.).

POLYOL G is the reaction adduct of propylene oxide and ethylene oxide with ethylene diamine in a molar ratio of 2/2/1 respectively. The resultant polyol has a functionality of 4 and a % of ∼23.99 (∼70.9 OH eq. wt.).

POLYOL H is the reaction product of an 80/20 mixture of 2,4-/2,6-toluene diamine and about 2 moles of ethylene oxide per amine hydrogen atom. The resultant polyol has a functionality of 4 and a % OH of ∼14.13 (∼120.3 OH eq. wt.).

POLYOL I is the reaction product of aniline with about 2 moles of ethylene oxide per amine hydrogen atom. The resultant polyol has a functionality of 2 and a % OH of ∼23.97 (∼131.1 OH eq. wt.).

POLYOL J was a polyoxypropylene glycol having an average equivalent weight of about 607 (% OH=-about 2.8).

ALIPHATIC AMINE A is ethylene diamine having an amine hydrogen equivalent weight of 15.

ALIPHATIC AMINE B is diethylene triamine having an amine hydrogen equivalent weight of 20.6.

ALIPHATIC AMINE C is aminoethylethanolamine having an amine hydrogen equivalent weight of 34.7 and a total active hydrogen equivalent weight of 26.

ALIPHATIC AMINE D is triethylenetetramine having an amine hydrogen equivalent weight of 24.3.

ALIPHATIC AMINE E is tetraethylenepentamine having an amine hydrogen equivalent weight of 27.

ALIPHATIC AMINE F is an aminated polyoxypropylene glycol having an average amine hydrogen equivalent weight of about 100 commercially available from Jefferson Chemical Co. as JEFFAMINE D-400.

ALIPHATIC AMINE G is an aminated polyoxypropylene glycol having an average amine hydrogen equivalent weight of about 500 commercially available from Jefferson Chemical Co. as JEFFAMINE D-2000.

CELL CONTROL AGENT A is a silicone fluid commercially available from Goldschmidt, A. G. as Tegostab B-1048.

CATALYST A is a 20/80 mixture by weight of triethylenediamine and N,N-dimethylethanolamine respectively.

CATALYST B is a tin mercaptide catalyst commercially available from Witco Chemical Co. as UL-6.

FOAMING AGENT A is trichloromonofluoromethane.

FOAMING AGENT B is water.

POLYISOCYANATE A was prepared by adding to 100 parts by weight of crude undistilled toluenediisocyanate containing 25-30% phosgenation by-products by weight, about 4 parts by weight Polyol A and 2 parts by weight dipropylene glycol. The mixture was reacted for about 1 hour at 60° C. The resultant urethane modified polyisocyanate had an NCO content of about 34.7% by weight and an NCO equivalent weight of about 121.

POLYISOCYANATE B was prepared substantially as example 1 of U.S. Pat. No. 3,652,424 employing the following changes.
1. The undistilled TDI used as the original reactor charge and subsequently as the diluting isocyanate contained about 85-90% volatile TDI and an NCO content of 43-45% by weight.
2. The levels of tetramethyl guanidine and benzoyl chloride were increased to 0.17 and 0.08 parts by weight respectively.
3. The polymerization temperature was maintained at less than 50° C.
4. The diluted product was reacted with about 6 parts of Polyol A at 80° C.
5. The resultant urethane modified polyisocyanate was mixed with less than 1% of a silicone fluid commercially available from Union Carbide Corporation as L-5340 to yield a polyisocyanate having an NCO content of 34.6% and an NCO equivalent weight of 120–124.

POLYISOCYANATE C was prepared by adding 5 parts by weight of Polyol A to 100 parts of crude undistilled toluenediisocyanate containing 10–15 weight percent phosgenation by-products and a percent NCO of 43–45. After reaction, the resultant urethane modified polyisocyanate at a percent NCO of about 40.2% and an NCO equivalent weight of about 104.

POLYISOCYANATE D was a polymethylene polyphenylisocyanate having an NCO equivalent weight of about 134 commercially available from Rubicon Chemical Co. as RUBINATE® M.

The examples and experiments were each conducted according to one of the following foaming procedures.

GENERAL FOAMING PROCEDURE

Foams were processed using either foaming procedure A or foaming procedure B. Two molds were used in these procedures: The Brett mold which was preheated to 125° F. and was used to determine minimum fill density, dimensional stability and expansion at demold, and a 2'×2'×2" mold which was preheated to 140° F., and was used to determine the thermal conductivities and compression strengths. The 2'×2'×2" mold was filled with ~604 grams of foam in order to attain a nominal 2 lbs/ft³ part density.

FOAMING PROCEDURE A

The general procedure was followed employing a Martin Sweets low pressure machine operating at the following conditions:
Isocyanate temperature—80° F. (26.7° C.)
Polyol temperature—70° F. (21.1° C.)
Isocyanate pressure—80 psi (5.6 kg/cm²)
Polyol pressure—80 psi (5.6 kg/cm²)
Mixer speed—5000 revolutions per minute
Throughput—~30 lbs/min (226.8 g/sec.)

FOAMING PROCEDURE B

The general procedure was followed employing an Admiral 900/2 HP high pressure machine, which is also referred to as a reaction injection molding (RIM) machine, operating at the following conditions:
Isocyanate temperature—90° F. (32.2° C.)
Polyol temperature—70° F. (21.1° C.)
Isocyanate pressure—1500 psi (105.5 kg/cm²)
Polyol pressure—1500 psi (105.5 kg/cm²)
Throughput—60–70 lbs/min (453.6–529.2 g/sec.)

The components and results are given in the following Table.

| COMPONENT AND PROPERTY | EXAMPLE AND COMPARATIVE EXPERIMENT NO. | | | |
|---|---|---|---|---|
| | A | 1 | 2 | 3 |
| Polyol, type/pbw[1]/OH eq.[2] | A/20/0.158 | A/19.7/0.155 B/2/0.004 | A/17.5/0.138 B/2/0.004 | A/17.6/0.139 B/2/0.004 |
| Aliphatic Amine, type/pbw/AMH eq.[3] | None | B/0.3/0.015 | B/0.5/0.024 | B/0.4/0.019 |
| Polyisocyanate, type/pbw/NCO eq.[4] | A/20.12/0.166 | A/20.85/0.171 | A/20.02/0.165 | A/19.75/0.163 |
| Foaming Agent, type/pbw/OH eq. | A/9.2/0 | A/9.2/0 | A/9.2/0 | A/9.2/0 |
| Catalyst, type/pbw/AH eq.[5] | A/0.62/0.006 B/0.02 | A/0.62/0.006 B/0.02 | A/0.62/0.006 B/0.02 | A/0.62/0.006 B/0.02 |
| Cell Control Agent, type/pbw | A/0.4 | A/0.4 | A/0.4 | A/0.4 |
| % Urea[6] | 0 | 5.1 | 8.4 | 6.7 |
| NCO/TAH ratio[7] | 1.01/1 | 0.98/1 | 0.96/1 | 0.97/1 |
| Cream Time, sec. | 9 | 6 | 2 | 4 |
| Gel Time, sec. | 46 | 48 | 43 | 45 |
| Tack Free Time, sec. | 65 | 62 | 60 | 60 |
| K-Factor, BTU/(hr.)(ft.²)(°F./in.) | .120 | .112 | .113 | .117 |
| Minimum Fill Density, lbs./ft.³ (g/cc) | 2.07 (0.033) | 2.1 (0.034) | 2.05 (0.033) | 2.05 (0.033) |
| % packing to Non-Shrink Density | 13 | <9.3 | 9.8 | 9.8 |
| Compressive Strength, dir./psi (kg/cm²) | X[8]/N.D.[11] Y[9]/26 (1.83) Z[10]/18.5 (1.3) | X/N.D. Y/N.D. Z/N.D. | X/N.D. Y/N.D. Z/N.D. | X/N.D. Y/N.D. Z/N.D. |
| Panel Density, lbs./ft.³ (g/cc) | 2.03 (0.033) | 2.02 (0.032) | 2.04 (0.033) | 1.98 (0.032) |
| Core Density, lbs./ft.³ (g/cc) | 1.83 (0.029) | 1.87 (0.03) | N.D. | N.D. |
| Foaming Procedure | A | A | A | A |

| COMPONENT AND PROPERTY | EXAMPLE AND COMPARATIVE EXPERIMENT NO. | | | |
|---|---|---|---|---|
| | B | 4 | 5 | 6 |
| Polyol, type/pbw[1]/OH eq.[2] | A/18/0.142 B/2/0.004 | A/19.5/0.154 | A/18.75/0.148 | A/19.55/0.154 |
| Aliphatic Amine, type/pbw/AMH eq.[3] | None | C/0.5/0.014 | C/0.25/0.007 G/1/0.002 | B/0.2/0.01 C/0.25/0.007 |
| Polyisocyanate, type/pbw/NCO eq.[4] | A/18.63/0.154 | A/21.52/0.178 | A/19.96/0.165 | A/21.42/0.177 |
| Foaming Agent, type/pbw/OH eq. | A/9.2/0 | A/9.2/0 | A/9.2/0 | A/9.2/0 |
| Catalyst, type/pbw/AH eq.[5] | A/0.62/0.006 B/0.02 | A/0.62/0.006 B/0.02 | A/0.62/0.006 B/0.02 | A/0.62/0.006 B/0.02 |
| Cell Control Agent, type/pbw | A/0.4 | A/0.4 | A/0.4 | A/0.4 |
| % Urea[6] | 0 | 5.22 | 5.78 | 5.98 |
| NCO/TAH ratio[7] | 1.01/1 | 0.99/1 | 1./1 | 0.99/1 |
| Cream Time, sec. | 8 | N.D. | 6 | 1 |
| Gel Time, sec. | 55 | 37 | 43 | 42 |
| Tack Free Time, sec. | 70 | 55 | 64 | 56 |
| K-Factor, BTU/(hr.)(ft.²)(°F./in.) | .121 | .118 | .114 | .114 |
| Minimum Fill Density, lbs./ft.³ (g/cc) | 2.07 (0.033) | 2.02 (0.032) | 2.01 (0.032) | 2.07 (0.033) |
| % packing to Non-Shrink Density | 13.9 | 15.8 | 10.9 | 6.6 |
| Compressive Strength, dir./psi (kg/cm²) | X/N.D. Y/N.D. | X/N.D. Y/24.1 (1.69) | X/N.D. Y/21.4 (1.5) | X/N.D. Y/15.3 (1.08) |

-continued

| | | | | |
|---|---|---|---|---|
| | | Z/N.D. | Z/18.3 (1.29) | Z/15 (1.05) | Z/10.9 (0.77) |
| Panel Density, lbs./ft.$^3$ (g/cc) | 2 (0.032) | 2 (0.032) | 2.03 (0.033) | 2 (0.032) |
| Core Density, lbs./ft.$^3$ (g/cc) | N.D. | 1.83 (0.029) | 1.78 (0.029) | 1.81 (0.029) |
| Foaming Procedure | A | A | A | A |

| COMPONENT AND PROPERTY | EXAMPLE AND COMPARATIVE EXPERIMENT NO. | | | |
|---|---|---|---|---|
| | 7 | C | 8 | D |
| Polyol, type/pbw$^1$/OH eq.$^2$ | A/13.5/0.106 C/6.0/0.055 | D/20/0.18 | D/19.7/0.177 | E/20/0.141 |
| Aliphatic Amine, type/pbw/AMH eq.$^3$ | C/0.5/0.014 | None | B/0.3/0.015 | None |
| Polyisocyanate, type/pbw/NCO eq.$^4$ | A/22.63/0.187 | A/24.77/0.205 | A/25.62/0.212 | A/19.74/0.163 |
| Foaming Agent, type/pbw/OH eq. | A/9.2/0 | A/9.2/0 B/0.1/0.011 | A/9.2/0 B/0.1/0.011 | A/9.2/0 B/0.1/0.011 |
| Catalyst, type/pbw/AH eq.$^5$ | A/0.3/0.003 B/0.02 | A/0.44/0.004 B/0.02 | A/0.44/0.004 B/0.02 | A/0.37/0.003 B/0.02 |
| Cell Control Agent, type/pbw | A/0.4 | A/0.4 | A/0.4 | A/0.4 |
| % Urea$^6$ | 5.12 | 0 | 4.59 | 0 |
| NCO/TAH ratio$^7$ | 1.02/1 | 1.05/1 | 1.02/1 | 1.05/1 |
| Cream Time, sec. | 2 | 6 | 4 | 7 |
| Gel Time, sec. | 47 | 38 | 32 | 43 |
| Tack Free Time, sec. | 65 | 50 | 43 | 60 |
| K-Factor, BTU/(hr.)(ft.$^2$)(°F./in.) | .11 | .113 | .111 | .114 |
| Minimum Fill Density, lbs./ft.$^3$ (g/cc) | 2.12 (0.034) | 1.95 (0.031) | 1.99 (0.032) | 1.87 (0.03) |
| % packing to Non-Shrink Density | 11.4 | 10.6 | N.D. | 15.3 |
| Compressive Strength, dir./psi (kg/cm$^2$) | X/N.D. Y/23.3 (1.64) Z/18.6 (1.31) | X/26.13 (1.84) Y/29 (2.04) Z/23.5 (1.65) | X/28.56 (2.01) Y/27.69 (1.95) Z/21.25 (1.49) | X/19.25 (1.35) Y/23.38 (1.64) Z/16.81 (1.18) |
| Panel Density, lbs./ft.$^3$ (g/cc) | 2.04 (0.033) | 2.11 (0.034) | 2.03 (0.033) | 2.05 (0.033) |
| Core Density, lbs./ft.$^3$ (g/cc) | 1.84 (0.029) | 1.85 (0.03) | 1.83 (0.029) | 1.75 (0.028) |
| Foaming Procedure | A | A | A | A |

| COMPONENT AND PROPERTY | EXAMPLE AND COMPARATIVE EXPERIMENT NO. | | | |
|---|---|---|---|---|
| | 9 | E | 10 | F |
| Polyol, type/pbw$^1$/OH eq.$^2$ | E/19.7/0.139 | E/12/0.085 F/8/0.07 | E/11.8/0.083 F/7.9/0.069 | A/12/0.095 H/8/0.067 |
| Aliphatic Amine, type/pbw/AMH eq.$^3$ | B/0.3/0.015 | None | B/0.3/0.015 | None |
| Polyisocyanate, type/pbw/NCO eq.$^4$ | A/20.83/0.172 | A/22.12/0.183 | A/23.31/0.193 | A/20.7/0.171 |
| Foaming Agent, type/pbw/OH eq. | A/9.2/0 B/0.1/0.011 | A/9.2/0 B/0.1/0.011 | A/9.2/0 B/0.1/0.011 | A/9.2/0 |
| Catalyst, type/pbw/AH eq.$^5$ | A/0.37/0.003 B/0.02 | A/0.37/0.003 B/0.02 | A/0.37/0.003 B/0.02 | A/0.3/0.003 B/0.02 |
| Cell Control Agent, type/pbw | A/0.4 | A/0.4 | A/0.4 | A/0.4 |
| % Urea$^6$ | 5.13 | 0 | 4.84 | 0 |
| NCO/TAH ratio$^7$ | 1.02/1 | 1.08/1 | 1.04/1 | 1.04/1 |
| Cream Time, sec. | 3 | 7 | 5 | 8 |
| Gel Time, sec. | 35 | 43 | 40 | 32 |
| Tack Free Time, sec. | 48 | 63 | 52 | 45 |
| K-Factor, BTU/(hr.)(ft.$^2$)(°F./in.) | .114 | .117 | .115 | .113 |
| Minimum Fill Density, lbs./ft.$^3$ (g/cc) | 1.87 (0.03) | 1.9 (0.03) | 1.94 (0.031) | 2.08 (0.033) |
| % packing to Non-Shrink Density | 8.2 | 9.4 | 10.1 | 10.4 |
| Compressive Strength, dir./psi (kgcm$^2$) | X/23.13 (1.63) Y/30.56 (2.15) Z/17.88 (1.26) | X/23.19 (1.63) Y/32.8 (2.31) Z/19.75 (1.39) | X/26.13 (1.84) Y/35.63 (2.5) Z/20.19 (1.42) | X/19.44 (1.37) Y/22 (1.55) Z/18.75 (1.32) |
| Panel Density, lbs./ft.$^3$ (g/cc) | 2.05 (0.033) | 2.03 (0.033) | 2.02 (0.032) | 1.94 (0.031) |
| Core Density, lbs./ft.$^3$ (g/cc) | 1.81 (0.029) | 1.78 (0.029) | 1.78 (0.029) | 1.79 (0.029) |
| Foaming Procedure | A | A | A | A |

| COMPONENT AND PROPERTY | EXAMPLE AND COMPARATIVE EXPERIMENT NO. | | | |
|---|---|---|---|---|
| | 11 | 12 | 13 | 14 |
| Polyol, type/pbw$^1$/OH eq.$^2$ | A/11.8/0.093 H/7.9/0.066 | A/19.5/0.154 | A/19.5/0.154 | A/19.5/0.154 |
| Aliphatic Amine, type/pbw/AMH eq.$^3$ | B/0.3/0.015 | D/0.5/0.021 | E/0.5/0.019 | D/0.5/0.021 |
| Polyisocyanate, type/pbw/NCO eq.$^4$ | A/21.59/0.178 | A/21.2/0.175 | A/21.13/0.175 | A/22.62/0.187 |
| Foaming Agent, type/pbw/OH eq. | A/9.2/0 | A/9.2/0 | A/9.2/0 | A/9.2/0 B/0.1/0.011 |
| Catalyst, type/pbw/AH eq.$^5$ | A/0.3/0.003 B/0.02 | A/0.6/0.005 B/0.02 | A/0.6/0.005 B/0.02 | A/0.6/0.005 B/0.02 |
| Cell Control Agent, | A/0.4 | A/0.4 | A/0.4 | A/0.4 |

-continued

| | | | | |
|---|---|---|---|---|
| type/pbw | | | | |
| % Urea[6] | 5.06 | 7.29 | 6.73 | 7.04 |
| NCO/TAH ratio[7] | 1.01/1 | 0.97/1 | 0.98/1 | 0.98/1 |
| Cream Time, sec. | 5 | 3-4 | 1 | 1 |
| Gel Time, sec. | 30 | 42 | 47 | 41 |
| Tack Free Time, sec. | 39 | 54 | 60 | 55 |
| K-Factor, BTU/(hr.)(ft.$^2$)(°F./in.) | .11 | .108 | .117 | .117 |
| Minimum Fill Density, lbs./ft.$^3$ (g/cc) | 2.06 (0.033) | 2.09 (0.033) | 2.08 (0.033) | 1.92 (0.03) |
| % packing to Non-Shrink Density | 8.9 | 7.1 | 9.6 | N.D. |
| Compressive Strength, dir./psi (kg/cm$^2$) | X/20.69 (1.45) Y/22.94 (1.61) Z/19.19 (1.35) | X/17.94 (1.26) Y/37.56 (2.64) Z/9.75 (0.69) | X/22.63 (1.59) Y/25.88 (1.82) Z/20.38 (1.43) | X/24.69 (1.74) Y/27.75 (1.95) Z/20.31 (1.43) |
| Panel Density, lbs./ft.$^3$ (g/cc) | 2.01 (0.032) | N.D. | 2.04 (0.033) | N.D. |
| Core Density, lbs./ft.$^3$ (g/cc) | 1.81 (0.029) | 1.78 (0.029) | 1.76 (0.028) | N.D. |
| Foaming Procedure | A | A | A | A |

| | EXAMPLE AND COMPARATIVE EXPERIMENT NO. | | | |
|---|---|---|---|---|
| COMPONENT AND PROPERTY | 15 | 16 | 17 | G |
| Polyol, type/pbw[1]/OH eq.[2] | A/18/0.142 | A/18/0.142 | A/19.7/0.155 | A/20/0.158 |
| Aliphatic Amine, type/pbw/AMH eq.[3] | F/2/0.02 | G/2/0.004 | B/0.3/0.015 | None |
| Polyisocyanate, type/pbw/NCO eq.[4] | A/19.41/0.16 | A/18.38/0.152 | A/20.85/0.172 | A/19.53/.161 |
| Foaming Agent, type/pbw/OH eq. | A/9.2/0 | A/9.2/0 | A/9.2/0 | A/9.2/0 |
| Catalyst, type/pbw/AH eq.[5] | A/0.62/0.006 B/0.02 | A/0.62/0.006 B/0.02 | A/0.62/0.006 B/0.02 | A/0.62/.006 B/0.02/ |
| Cell Control Agent, type/pbw | A/0.4 | A/0.4 | A/0.4 | A/0.4 |
| % Urea[6] | 11.08 | 6.22 | 5.1 | 0 |
| NCO/TAH ratio[7] | 0.95/1 | 1/1 | 0.98/1 | 0.98/1 |
| Cream Time, sec. | 1 | N.D. | 4 | 12 |
| Gel Time, sec. | 39 | N.D. | 43 | 48 |
| Tack Free Time, sec. | 61 | N.D. | 58 | 62 |
| K-Factor, BTU/(hr.)(ft.$^2$)(°F./in.) | .115 | .12 | .111 | 0.116 |
| Minimum Fill Density, lbs./ft.$^3$ (g/cc) | 2.01 (0.032) | 2.02 (0.032) | 1.93 (0.031) | 2.095 (0.034) |
| % packing to Non-Shrink Density | 10.3 | 12.1 | 8.7 | 14.4 |
| Compressive Strength, dir./psi (kg/cm$^2$) | N.D. N.D. N.D. | N.D. N.D. N.D. | N.D. N.D. N.D. | N.D. N.D. N.D. |
| Expansion at demold after 6 min. with 14% packing, mm | | | | 3.9 |
| Panel Density, lbs./ft.$^3$ (g/cc) | 1.98 (0.032) | 1.97 (0.032) | 2.00 (0.032) | 2.04 |
| Core Density, lbs./ft.$^3$ (g/cc) | 1.98 (0.032) | 1.74 (0.028) | 1.83 (0.029) | 1.84 (0.029) |
| Foaming Procedure | A | A | A | A |

| | EXAMPLE AND COMPARATIVE EXPERIMENT NO. | | | |
|---|---|---|---|---|
| COMPONENT AND PROPERTY | 18 | 19 | 20 | 21 |
| Polyol, type/pbw[1]/OH eq.[2] | A/19.6/0.155 | A/19.3/0.152 | A/18.5/0.146 | A/17.8/0.140 |
| Aliphatic Amine, type/pbw/AMH eq.[3] | B/0.1/0.005 | B/0.2/0.010 | B/0.4/0.019 | B/0.6/0.029 |
| Polyisocyanate, type/pbw/NCO eq.[4] | A/19.53/0.161 | A/19.53/0.161 | A/19.53/0.161 | A/19.53/0.161 |
| Foaming Agent, type/pbw/OH eq. | A/9.06/0 | A/8.97/0 | A/8.71/0 | A/8.46/0 |
| Catalyst, type/pbw/AH eq.[5] | A/0.611/0.005 B/0.0197 | A/0.605/0.005 B/0.0195 | A/0.59/0.005 B/0.0189 | A/0.57/0.005 B/0.018 |
| Cell Control Agent, type/pbw | A/0.39 | A/0.38 | A/0.38 | A/0.37 |
| % Urea[6] | 1.76 | 3.54 | 6.89 | 10.63 |
| NCO/TAH ratio[7] | 0.98/1 | 0.96/1 | 0.95/1 | 0.93/1 |
| Cream Time, sec. | 10 | 8 | 4 | 0 |
| Gel Time, sec. | 48 | 45 | 41 | 34 |
| Tack Free Time, sec. | 65 | 60 | 55 | 45 |
| K-Factor, BTU/(hr.)(ft.$^2$)(°F./in.) | 0.113 | 0.112 | 0.111 | 0.114 |
| Minimum Fill Density, lbs./ft.$^3$ (g/cc) | 2.09 (0.033) | 2.11 (0.034) | 2.05 (0.033) | 2.11 (0.034) |
| % packing to Non-Shrink Density | 7.7 | <8.9 | 7.4 | 6.1 |
| Compressive Strength, dir./psi (kg/cm$^2$) | N.D. | N.D. | N.D. | N.D. |
| Expansion at demold after 6 min. with 14% packing, mm | 2.9 | 2.5 | 2.4 | 2.1 |

-continued

| | | | | |
|---|---|---|---|---|
| Panel Density, lbs./ft.$^3$ (g/cc) | 2.01 (0.032) | 2.05 (0.033) | 2.06 (0.033) | 2.02 (0.032) |
| Core Density, lbs./ft.$^3$ (g/cc) | 1.87 (0.030) | 1.91 (0.031) | 1.88 (0.030) | 1.83 (0.029) |
| Foaming Procedure | A | A | A | A |

| | EXAMPLE AND COMPARATIVE EXPERIMENT NO. | | | |
|---|---|---|---|---|
| COMPONENT AND PROPERTY | H | 22 | 23 | 24 |
| Polyol, type/pbw[1]/OH eq.[2] | F/90/0.783 J/10/0.016 | F/90/0.783 J/10/0.016 | F/90/0.783 J/10/0.016 | F/90/0.783 J/10/0.016 |
| Aliphatic Amine, type/pbw/AMH eq.[3] | None | B/1.0/0.049 | B/1.5/0.073 | B/2.0/0.097 |
| Polyisocyanate, type/pbw/NCO eq.[4] | B/117.4/0.962 | B/121.1/0.993 | B/123.1/1.009 | B/125.1/1.025 |
| Foaming Agent, type/pbw/OH eq. | A/46.0 $H_2O$/1.25/0.139 | A/46.0 $H_2O$/1.25/0.139 | A/46.0 $H_2O$/1.25/0.139 | A/46.0 $H_2O$/1.25/0.139 |
| Catalyst, type/pbw/AH eq.[5] | A/2.75/0.025 B/0.1 | A/2.75/0.025 B/0.1 | A/2.75/0.025 B/0.1 | A/2.75/0.025 B/0.1 |
| Cell Control Agent, type/pbw | A/1.25 | A/1.25 | A/1.25 | A/1.25 |
| % Urea[6] | None | 3.09 | 4.56 | 6.0 |
| NCO/TAH ratio[7] | 1/1 | 0.98/1 | 0.97/1 | 0.97/1 |
| Cream Time, sec. | 9 | 6 | 4 | 1 |
| Gel Time, sec. | 52 | 44 | 39 | 30 |
| Tack Free Time, sec. | 64 | 58 | 53 | 42 |
| K-Factor, BTU/(hr.)(ft.$^2$)(°F./in.) | 0.127 | 0.124 | 0.122 | 0.122 |
| Minimum Fill Density, lbs./ft.$^3$ (g/cc) | 1.74 (0.027) | 1.76 (0.028) | 1.78 (0.028) | 1.81 (0.029) |
| % packing to Non-Shrink Density | 14.9 | 11.9 | 11.2 | 8.8 |
| Compressive Strength, dir./psi (kg/cm$^2$) | X/19.9 (1.40) Y/26.9 (1.89) Z/19.1 (1.34) | X/18.4 (1.29) Y/26.6 (1.87) Z/18.1 (1.27) | X/18.8 (1.32) Y/29.7 (2.09) Z/17.9 (1.26) | X/14.6 (1.03) Y/21.6 (1.52) Z/14.3 (1.01) |
| Expansion at demold after 6 min. with 14% packing, mm | N.D. | N.D. | N.D. | N.D. |
| Panel Density, lbs./ft.$^3$ (g/cc) | 2.0 (0.032) | 2.02 (0.032) | 2.01 (0.032) | 1.86 (0.03) |
| Core Density, lbs./ft.$^3$ (g/cc) | 1.88 (0.030) | 1.85 (0.030) | 1.76 (0.028) | 1.66 (0.027) |
| Foaming Procedure | A | A | A | A |

| | EXAMPLE AND COMPARATIVE EXPERIMENT NO. | | |
|---|---|---|---|
| COMPONENT AND PROPERTY | 25 | I | 26 |
| Polyol, type/pbw[1]/OH eq.[2] | F/90/0.783 B/10/0.019 | A/100/0.789 | A/100/0.789 |
| Aliphatic Amine, type/pbw/AMH eq.[3] | B/2.0/0.097 | None | B/1.5/0.073 |
| Polyisocyanate, type/pbw/NCO eq.[4] | C/113.1/1.088 | D/129.85/.969 | D/136.3/1.017 |
| Foaming Agent, type/pbw/OH eq. | A/40 | A/46.0 $H_2O$/1.0/0.111 | A/46.0 $H_2O$/1.0/0.111 |
| Catalyst, type/pbw/AH eq.[5] | A/2.5/0.022 B/0.1 | A/3.0/0.027 B/0.1 | A/3.0/0.027 B/0.1 |
| Cell Control Agent, type/pbw | A/2.0 | A/2.0 | A/2.0 |
| % Urea[6] | 5.57 | None | 4.68 |
| NCO/TAH ratio[7] | 1.18/1 | 1.05/1 | 1.02/1 |
| Cream Time, sec. | N.D. | 8 | 4 |
| Gel Time, sec. | N.D. | 46 | 35 |
| Tack Free Time, sec. | N.D. | 58 | 47 |
| K-Factor, BTU/(hr.)(ft.$^2$)(°F./in.) | 0.128 | 0.124 | 0.121 |
| Minimum Fill Density, lbs./ft.$^3$ (g/cc) | 1.57 (0.025) | 1.99 (0.032) | 2.02 (0.032) |
| % packing to Non-Shrink Density | 18.6 | 18.6 | 14.4 |
| Compressive Strength, dir./psi (kg/cm$^2$) | X/15.5 (1.09) Y/21.9 (1.54) Z/13.6 (0.96) | X/10.7 (0.75) Y/29.2 (2.05) Z/14.7 (1.03) | X/11.9 (0.84) Y/28.8 (2.02) Z/13.0 (0.91) |
| Expansion at demold after 6 min. with 14% packing, mm | N.D. | N.D. | N.D. |
| Panel Density, lbs./ft.$^3$ (g/cc) | 1.81 (0.029) | 1.99 (0.032) | 2.03 (0.032) |
| Core Density, lbs./ft.$^3$ (g/cc) | 1.68 (0.027) | 1.81 (0.029) | 1.86 (0.030) |

| Foaming Procedure | A | A | A |
|---|---|---|---|

FOOTNOTES TO TABLE
[1]PBW = parts by weight
[2]OH EQ. = number of hydroxyl equivalents
[3]AMH EQ. = number of amine hydrogen equivalents
[4]NCO EQ. = number of isocyanate equivalents
[5]AH EQ. = number of active hydrogen equivalents and includes the hydrogens contributed by hydroxyl and primary and secondary amine groups.
[6]% UREA = the weight percent of the theoretical reaction product of the amine hydrogen atoms of the aliphatic primary amine-containing component with a stoichiometric quantity of any NCO- and/or NCS-containing compound based upon the combined weight of the polyol component, NCO- and/or NCS containing component, the aliphatic primary amine containing component and any other component having one or more active hydrogens reactive with said NCO- and/or NCS-containing compounds. The % urea for Example 9 is calculated as follows: .3 pbw of primary amine hydrogen-containing component B containing 0.015 amine hydrogen equivalents which requires 0.015 equivalents (1.815 pbw of polyisocyanate A to theoretically react therewith. Therefore, the reaction product would contain 2.115 pbw (1.815 + .3). The total pbw of active hydrogen containing compounds plus polyisocyanate is 19.7 + 0.3 + 20.83 + 0.1 + 0.296 (polyol pbw + aliphatic amine hydrogen-containing component + polyisocyanate + water + 80% of catalyst A) = 41.226. % urea = (2.115 ÷ 41.226) × 100 = 0.0513 × 100 = 5.13
[7]NCO/TAH RATIO = ratio of number of NCO groups per total number of active hydrogen atoms regardless of source.
[8]The X direction is parallel to the filling flow in the 2' × 2' × 2" mold in the 2' × 2" plane.
[9]The Y direction is perpendicular to the flow.
[10]The Z direction is parallel to the flow in the 2' × 2' plane.
[11]N.D. = not determined

We claim:

1. In a process for preparing a rigid foam by reacting a mixture containing (A) a polyol compound or mixture of polyol compounds containing a plurality of hydroxyl groups with (B) a compound or mixture of compounds containing a plurality of NCO and/or NCS groups each said polyol and compound containing NCO and/or NCS groups being of sufficient functionality, equivalent weight and quantity so as to result in a rigid foam in the presence of (C) at least one foaming agent and (D) at least one catalyst; the improvement which comprises incorporating into said reaction mixture (E) at least one compound having at least one primary aliphatic amine group and having an average molecular weight of from about 60 to about 200 in an amount which provides a ratio of aliphatic amine hydrogen equivalents to hydroxyl equivalents of from about 0.025:1 to about 0.25:1 so as to improve at least one of the properties of the resultant foam selected from K-factor, dimensional stability and expansion at demold.

2. A process of claim 1 wherein the polyol component (A) has an average hydroxyl equivalent weight of from about 50 to about 250 and an average hydroxyl functionality of from about 2 to about 8; component (B) is a polyisocyanate having an average NCO equivalent weight of from about 50 to about 250 and an average NCO functionality of from about 2 to about 4; and component (E), the aliphatic primary amine-containing compound has an average molecular weight of from about 100 to about 150, and is present in a quantity so as to provide a ratio of aliphatic amine hydrogen equivalents to hydroxyl equivalents of from about 0.06:1 to about 0.15:1.

3. A process of claim 2 wherein the polyol component (A) has an average hydroxyl equivalent weight of from about 69 to about 180 and an average functionality of from about 2.5 to about 6; and the polyisocyanate component (B) has an average NCO equivalent weight of from about 100 to about 160 and an average NCO functionality of from about 2.3 to about 3.5.

4. A process of claim 3 wherein the polyol component (A) contains a mixture of an adduct of either (1) a mixture of sucrose and glycerine with one or more alkylene oxides having from two to about 4 carbon atoms or (2) a mixture of (a) an adduct of sucrose with said alkylene oxide(s) and (b) an adduct of glycerine with said alkylene oxide(s); and the polyisocyanate component is toluene diisocyanate, methylenediphenyldiisocyanate or any mixture thereof.

5. A process of claim 1, 2, 3 or 4 wherein component (E), the aliphatic primary amine-containing compound, is ethylenediamine, diethylenetriamine, aminoethylethanolamine, triethylenetetramine, tetraethylenepentamine, or mixture thereof.

6. A rigid foam resulting from foaming a composition containing (A) a polyol or mixture of polyols which polyol or polyol mixture has an average hydroxyl functionality of from about 2 to about 8 and an average hydroxyl equivalent weight of from about 50 to about 250; (B) a component containing a plurality of NCO and/or NCS groups and (C) a component containing at least one compound having at least one aliphatic primary amine group and having an average molecular weight of from about 60 to about 200 and wherein component (C) is present in a quantity which provides a ratio of aliphatic amine hydrogen equivalents to hydroxyl equivalents of from about 0.025:1 to 0.25:1 and which is sufficient to improve one or more of the foam properties selected from K-factor, dimensional stability and expansion at demold when compared to a like rigid foam prepared without component (C).

7. The rigid foam of claim 6 wherein the polyol component (A) has an average hydroxyl equivalent weight of from about 69 to about 180 and an average hydroxyl functionality of from about 2.5 to about 6; component (B) is a polyisocyanate having an average NCO equivalent weight of from about 80 to about 250 and an average NCO functionality of from about 2 to about 4; and the aliphatic primary amine-containing compound has an average molecular weight of from about 100 to about 150 and is present in a quantity so as to provide a ratio of aliphatic amine hydrogen equivalents to hydroxyl equivalents of from about 0.06:1 to about 0.15:1.

8. The rigid foam of claim 7 wherein the polyol component (A) has an average hydroxyl equivalent weight of from about 80 to about 130 and an average hydroxyl functionality of from about 3 to about 5; the polyisocyanate component (B) has an average NCO equivalent weight of from about 100 to about 160 and an average NCO functionaltiy of from about 2.3 to about 3.5; and the aliphatic amine-containing compound is present in a quantity such that the percent urea is from about 3 to about 15.

9. The rigid foam of claim 8 wherein the polyol component (A) contains an adduct resulting from reacting a mixture of sucrose and glycerine with one or more alkylene oxides having from two to about 4 carbon atoms; the polyisocyanate component is urethane modified undistilled toluene diisocyanate.

10. The rigid foam of claim 6, 7, 8 or 9 wherein the aliphatic primary amine-containing compound is ethylenediamine, diethylenetriamine, aminoethylethanolamine, triethylenetetramine, tetraethylenepentamine or mixture thereof.

11. A mixture of active hydrogen-containing materials which comprises:
- (A) a polyol or mixture of polyols which polyol or polyol mixture has an average hydroxyl functionality of from about 2 to about 8 and an average hydroxyl equivalent weight of from about 50 to about 250; and
- (B) at least one compound having at least one primary aliphatic amine group and an average molecular weight of from about 60 to about 200;

wherein component (B) is present in a quantity which provides a ratio of aliphatic amine hydrogen equivalents to hydroxyl equivalents of from about 0.025:1 to about 0.25:1 such that the foam (which results from subjecting to foaming conditions a mixture containing
- (1) said mixture of (A) and (B);
- (2) at least one compound containing a plurality of NCO and/or NCS groups;
- (3) at least one foaming agent; and
- (4) at least one catalyst for reacting component (1) with component (2); said component (2) being of sufficiently functionality, equivalent weight and quantity such that the resulting foam is rigid in character)

has an improvement in one or more of the properties selected from (a) K-factor, (b) dimensional stability and (c) expansion at demold when compared to a foam prepared from components (1), (2), (3) and (4) except that component (1) does not contain component (B).

12. A mixture of claim 11 wherein component (A) has an average hydroxyl equivalent weight of from about 69 to about 180 and an average functionality of from about 2.5 to about 6; component (2) is a polyisocyanate having an average NCO equivalent weight of from about 80 to about 250 and an average NCO functionality of from about 2 to about 4; and component (B) has an average molecular weight of from about 100 to about 150 and is present in a quantity so as to provide a ratio of aliphatic amine hydrogen equivalents to hydroxyl equivalents of from about 0.06:1 to about 0.15:1.

13. A mixture of claim 12 wherein component (A) has an average hydroxyl equivalent weight of from about 80 to about 130 and an average hydroxyl functionality of from about 3 to about 5; and component (2) has an NCO equivalent weight of from about 100 to about 160 and an average NCO functionality of from about 2.3 to about 3.5.

14. A mixture of claim 13 wherein component (A) contains an adduct of a mixture of sucrose and glycerine with one or more alkylene oxides having from 1 to about 4 carbon atoms and component 2 is urethane modified toluene diisocyanate distillation bottoms product.

15. A mixture of claim 11, 12, 13 or 14 wherein component (B) is ethylenediamine, diethylenetriamine, aminoethylethanolamine, triethylenetetramine, tetraethylenepentamine or mixtures thereof.

* * * * *